United States Patent
Muir

(10) Patent No.: US 9,004,812 B2
(45) Date of Patent: Apr. 14, 2015

(54) SYSTEM FOR CONTROLLING RAINWATER RUN-OFF

(71) Applicant: Ridvan Garden Developments Limited, Titahi Bay, Porirua (NZ)

(72) Inventor: Anthony Robert Muir, Wellington (NZ)

(73) Assignee: Ridvan Garden Developments Limited, Porirua (NZ)

(*) Notice: Subject to any disclaimer, the term of this patent is extended or adjusted under 35 U.S.C. 154(b) by 0 days.

(21) Appl. No.: 13/915,345

(22) Filed: Jun. 11, 2013

(65) Prior Publication Data
US 2014/0056644 A1 Feb. 27, 2014

(30) Foreign Application Priority Data
Jun. 12, 2012 (NZ) ........................................ 600579

(51) Int. Cl.
*E02B 11/00* (2006.01)
*E03F 3/02* (2006.01)

(52) U.S. Cl.
CPC ................. *E02B 11/005* (2013.01); *E03F 3/02* (2013.01)

(58) Field of Classification Search
CPC .......... E02B 11/00; E02B 11/005; E03F 3/02
USPC ......................................... 405/36, 39, 40, 53
See application file for complete search history.

(56) References Cited

U.S. PATENT DOCUMENTS

| 4,457,646 A * | 7/1984 | Laesch ............................ 405/52 |
| 5,342,144 A * | 8/1994 | McCarthy ........................ 405/39 |
| 5,433,845 A * | 7/1995 | Greene et al. ............. 210/170.03 |
| 7,114,877 B2 * | 10/2006 | Wilkerson ........................ 405/43 |
| 7,182,856 B2 * | 2/2007 | Pank ................................ 210/97 |
| 7,857,545 B2 * | 12/2010 | Burcham ......................... 405/36 |
| 2006/0159519 A1 * | 7/2006 | Schluter et al. ................. 405/39 |
| 2008/0205987 A1 * | 8/2008 | Furrer et al. .................... 405/38 |

* cited by examiner

*Primary Examiner* — Benjamin Fiorello
(74) *Attorney, Agent, or Firm* — Locke Lord LLP; Jeffrey D. Hsi

(57) ABSTRACT

A system for controlling rainwater runoff has an inlet conduit. A first junction is connected to the inlet conduit. A by-pass conduit connects the first junction with a second junction. A first transfer conduit connects the first junction with a storage tank. A second transfer conduit connects the storage tank with the second junction. An outlet conduit connects with the second junction. The system is arranged such that it provides substantial rain-water drainage.

9 Claims, 1 Drawing Sheet

SYSTEM FOR CONTROLLING RAINWATER RUN-OFF

CROSS-REFERENCE TO RELATED APPLICATION

This application claims priority of New Zealand Patent Application No. 600579, filed Jun. 12, 2012, the entire contents of the aforementioned application is hereby incorporated herein by reference.

FIELD OF INVENTION

This invention relates to a system for controlling the rainwater run-off from, for example, a land site developed for building construction.

BACKGROUND

When land is developed for residential or commercial buildings it is often necessary to make provision for dealing with rainwater run-off. Failure to do so can lead to undesirable flooding in the event of heavy rainfall. It is an object of a preferred form of the invention to go at least some way towards addressing this problem.

SUMMARY OF INVENTION

According to one aspect of the invention there is provided a system for controlling rainwater run-off, comprising:
 a) an inlet conduit;
 b) a first junction which receives the inlet conduit;
 c) a by-pass conduit connecting the first junction with a second junction;
 d) a first transfer conduit connecting the first junction with a storage tank;
 e) a second transfer conduit connecting the storage tank with the second junction; and
 f) an outlet conduit connected to the second junction;
the system arranged such that it provides substantial rainwater drainage to a site (eg a building site) whereby water runs along the inlet conduit to the first junction and, as a matter of priority, runs away from the first junction via the by-pass conduit to the second junction but, in the event that water enters the first junction at a rate faster than the ability of the by-pass conduit to carry it away a portion of the water entering the first junction flows along the first transfer conduit into the storage tank and gradually runs from the storage tank to the second junction via the second transfer conduit (directly or indirectly), the system arranged such that water which arrives at the second conduit is able to drain away from there via the outlet conduit.

Optionally the system comprises a second storage tank connected to the first mentioned storage tank by way of an inter-tank conduit, the second storage tank connected to the second junction by way of a third transfer conduit, the arrangement being such that at least some overflow water from the first storage tank runs along the inter-tank conduit to the second storage tank and gradually runs from the second storage tank to the second junction via the third transfer conduit.

Optionally the, or the first mentioned, storage tank has an overflow conduit arranged to carry at least some overflow water from such tank to the second junction, the overflow conduit being connected to said tank higher than the second transfer conduit.

Optionally the second storage tank has an overflow conduit arranged to carry at least some overflow water from such tank to the second junction, said overflow conduit being connected to said tank higher than the third transfer conduit.

Optionally the second storage tank is larger than the first storage tank.

Optionally the storage tank or, as the case may be the first and/or second storage tank(s), is/are substantially buried in the ground.

Optionally the system comprises an energy dissipater arranged to receive water via the outlet conduit and dissipate kinetic energy from the water by causing it to encounter a baffle or a series of baffles.

BRIEF DESCRIPTION OF THE DRAWINGS

Some preferred embodiments of the invention will now be described by way of example and with reference to the accompanying drawings, of which.

DETAILED DESCRIPTION

In the context of preparing an area of land for building it is important to make adequate provision for dealing with rainwater run-off. If a site has inadequate drainage then regulatory authorities may decline to give consent to build on it. Even though extreme weather events may be unusual, it is desirable for a site to be able to cope with intense amounts of rainfall, for example a 1 in 2 year, or a 1 in 10 year, event.

Figure 1:
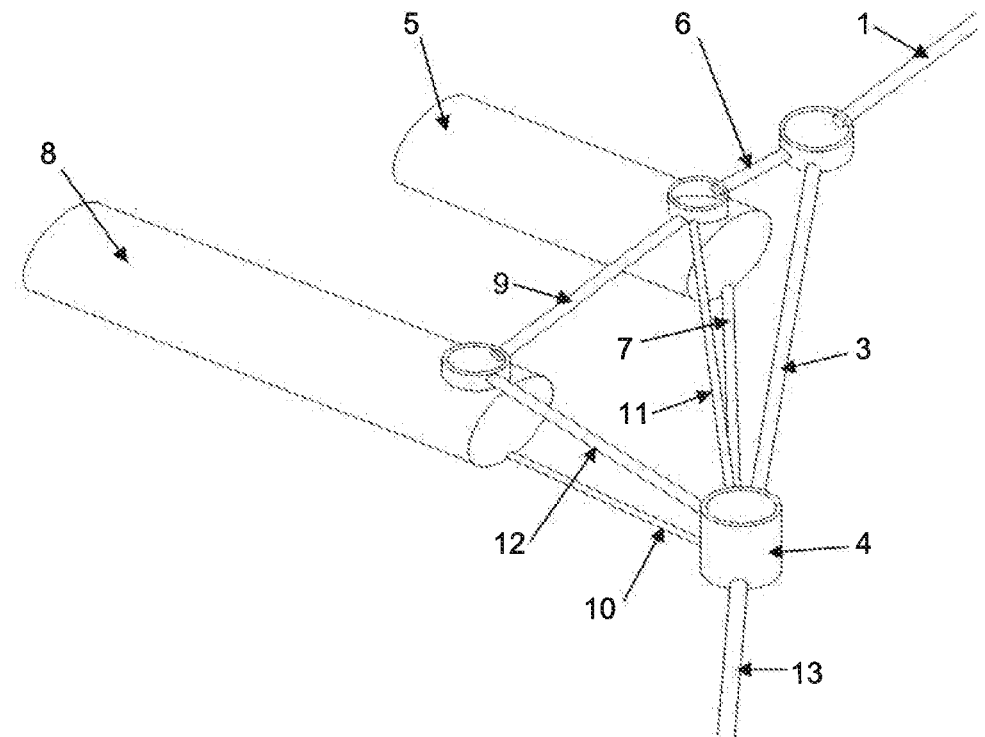
FIG. 1 is a schematic perspective view of a system for controlling rainwater run-off at a building site.

As shown in FIG. 1, a building site has an inlet conduit 1 which carries rainwater collected from site drains (not shown) (the building site may be a clear site, a site with a partially constructed building or a site with a completed building). The inlet conduit 1 carries water downwards under gravity to a concrete terminal or first junction 2. A by-pass conduit 3 connects the junction 2 with a lower concrete terminal or second junction 4. The first junction 2 is also connected to a small tank 5 by way of a first transfer conduit 6. The tank 5 is of a size sufficient to cope with a 1 in 2 year rain event. As shown, the by-pass conduit 3 is arranged lower at the first junction 2 than the first transfer conduit 6. This means that water entering the first junction 2, as a matter of priority, drains away to the second junction 4 via the by-pass conduit 3.

If water arrives at the first junction 2 faster than it is able to drain away via the by-pass conduit 3 then the water level in the junction 2 rises until it reaches the level of the first transfer conduit 6. The water then drains into the small tank 5. The tank 5 holds the water and gradually releases it under gravity to the second junction 4 via a low second transfer conduit 7. By having the widths of the by-pass and first transfer conduits 3, 7 at pre-determined sizes the rate that rainwater runs off the site is controlled. Flow rate through these conduits 3, 7 may also be controlled by baffle plates in the path of the water wherein such plates have openings of a predetermined size or sizes.

To deal with a situation where the amount of rainwater to the site is extreme the system has a lower second tank 8 larger than the first one. The second tank 8 is of a size sufficient to cope with a 1 in 10 year rain event. The two tanks are connected by an inter-tank conduit 9 which allows overflow water from the first tank 5 to drain under gravity to the second tank 8. Water from the second tank 8 then gradually drains away under gravity to the second junction 4 via a low third transfer conduit 10. The width of the third transfer conduit 10 is selected to give the desired flow rate and to therefore further control the rate that rainwater runs off the site. A baffle plate as described above may also be used with the third transfer conduit.

With further reference to FIG. 1, each tank has an upper overflow conduit 11, 12 respectively to carry overflow water from the tanks to the second junction 4. Water drains away from the second junction 4 under gravity via an outlet conduit 13.

Figure 2:
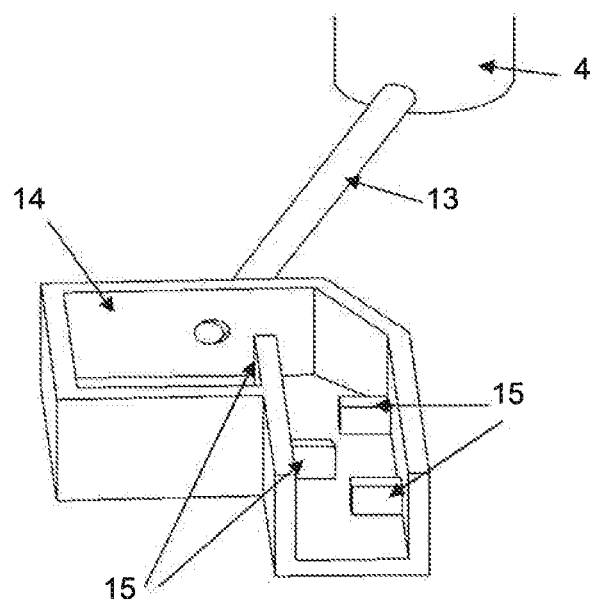
FIG. 2 is an inside perspective view of an energy dissipater forming part of the system.

Referring to FIG. 2, water from the outlet conduit 13 drains to an energy dissipater 14 (shown without its roof for ease of description). In the preferred embodiment the dissipater 14 comprises a concrete chamber having a series of internal walls or baffles 15 arranged to obstruct and therefore slow down the flow of water through the chamber. This reduces the kinetic energy of run-off water before it leaves the dissipater and/or the site.

In preferred embodiments all of the conduits mentioned above are in the form of lengths of pipe having a circular transverse cross section, although suitable alternatives conduits may be substituted if desired. Preferably the conduits, the junctions and the tanks are at least substantially buried. Inspection grates or manholes or he like may be visible from above ground. In further embodiments some or all of the conduits, the junctions and tanks may be at least substantially above ground.

While the system has been exemplified in connection with 1 in 2 and 1 in 10 year rain event tanks, the tank sizes can be alternatively made to suit the needs of the site on which they are used or to comply the controlling building regulations. In some embodiments the first tank may be larger than the second or subsequent tank(s).

It will be appreciated that controlling rainwater run-off with the combination of a storage tank together with a by-pass conduit means that water running from a site can be relatively readily maintained at a natural or near natural flow rate. Further, because not all water has to be run into a tank before being released the size of the tank or tanks can be readily minimised.

While some preferred forms of the invention have been described by way of example, it should be appreciated that modifications and improvements can occur without departing from the scope of the following claims.

The invention claimed is:

1. A system for controlling rainwater run-off, comprising:
   a. an inlet conduit;
   b. a first junction which receives the inlet conduit;
   c. a by-pass conduit connecting the first junction with a second junction;
   d. a first transfer conduit connecting the first junction with a first storage tank;
   e. a second transfer conduit connecting the first storage tank with the second junction; and
   f. an outlet conduit connected to the second junction;

the system arranged such that it provides substantial rainwater drainage to a site whereby water runs along the inlet conduit to the first junction and, as a matter of priority, runs away from the first junction via the by-pass conduit to the second junction but, in the event that water enters the first junction at a rate faster than the ability of the by-pass conduit to carry it away a portion of the water entering the first junction flows along the first transfer conduit into the first storage tank and gradually runs from the first storage tank to the second junction via the second transfer conduit, the system arranged such that water which arrives at the second conduit is able to drain away from there via the outlet conduit.

2. A system according to claim 1, comprising a second storage tank connected to the first storage tank by way of an inter-tank conduit, the second storage tank connected to the second junction by way of a third transfer conduit, the arrangement being such that at least some overflow water from the first storage tank runs along the inter-tank conduit to the second storage tank and gradually runs from the second storage tank to the second junction via the third transfer conduit.

3. A system according to claim 2, wherein the first storage tank has an overflow conduit arranged to carry at least some overflow water from the first storage tank to the second junction, the overflow conduit being connected to the first storage tank higher than the second transfer conduit.

4. A system according to claim 3, wherein the second storage tank has an overflow conduit arranged to carry at least some overflow water from the second storage tank to the second junction, said overflow conduit being connected to the second storage tank higher than the third transfer conduit.

5. A system according to claim 4, wherein the second storage tank is larger than the first storage tank.

6. A system according to claim 5, comprising an energy dissipater arranged to receive water via the outlet conduit and dissipate kinetic energy from the water by causing it to encounter a baffle or a series of baffles.

7. A system according to claim 4, wherein the first storage tank and the second storage tanks are substantially buried in the ground.

8. A system according to claim 1, wherein the first storage tank is substantially buried in the ground.

9. A system according to claim 1, comprising an energy dissipater arranged to receive water via the outlet conduit and dissipate kinetic energy from the water by causing it to encounter a baffle or a series of baffles.

* * * * *